United States Patent [19]

Maslanka et al.

[11] 4,293,667

[45] Oct. 6, 1981

[54] ORGANIC PIGMENTS

[75] Inventors: William W. Maslanka, London-Britain Township, Chester County; Gavin G. Spence, New Castle County, both of Pa.

[73] Assignee: Hercules Incorporated, Wilmington, Del.

[21] Appl. No.: 161,804

[22] Filed: Jun. 23, 1980

Related U.S. Application Data

[60] Division of Ser. No. 909,606, May 25, 1978, Pat. No. 4,235,982, which is a continuation-in-part of Ser. No. 803,330, Jun. 3, 1977, abandoned.

[51] Int. Cl.$^3$ .................................... C08F 267/10
[52] U.S. Cl. .................... 525/284; 525/260; 525/265; 525/289; 525/292; 525/293; 525/296; 525/303; 525/313; 525/316; 525/317

[58] Field of Search .............. 525/284, 260, 265, 289, 525/292, 293, 296, 303, 313, 316, 317

[56] References Cited

U.S. PATENT DOCUMENTS

| | | | |
|---|---|---|---|
| 2,958,673 | 11/1960 | Jen | 525/307 |
| 3,032,539 | 5/1962 | Schuller et al. | 526/310 |
| 3,840,504 | 10/1974 | Reim | 526/310 |

*Primary Examiner*—J. Ziegler

[57] ABSTRACT

Disclosed are novel organic pigments adapted particularly for use as fillers for paper. The organic pigments are finely divided particles obtained by graft copolymerizing an ethylenically unsaturated monomer, such as styrene, onto a water-soluble cationic prepolymer in an aqueous solution and in the presence of a free-radical polymerization initiator.

28 Claims, No Drawings

ORGANIC PIGMENTS

This application is a division of application Ser. No. 909,606, filed May 25, 1978, U.S. Pat. No. 4,235,982, which application is a continuation-in-part of application Ser. No. 803,330, filed June 3, 1977, now abandoned.

This invention relates to novel organic pigments adapted particularly for use as paper fillers.

Paper is often filled with mineral fillers such as clay, calcium carbonate or titanium dioxide. The function of a mineral filler is to increase the opacity of the paper and prevent "show-through"; low opacity leads to page-to-page show-through in printed matter such as books, magazines and newspapers. While the mineral fillers perform this function very well at relatively low cost, they also have disadvantages. First, they reduce paper strength substantially. This can cause problems in later use, but more importantly, low sheet strength can make it necessary to run the paper machine at slower speeds. The second disadvantage is that the mineral fillers have relatively high densities (sp. gr. 2.5–4.0) and thus increase the weight of filled paper. This is becoming more of a problem as the rising cost of mailing printed material, such as magazines, is increasing the demand for lightweight paper. Thus, there is a need in the paper industry for a low density opacifier for paper that will not adversely affect the strength of the paper.

The use of latex particles as lightweight fillers for paper is known in the art. Polystyrene latexes are commercially available for this application. Like mineral fillers, these polystyrene latexes consist of anionic particles that require cationic retention aids for good retention on anionic pulp fibers. In addition, polystyrene latex fillers decrease the strength of filled paper, although less than mineral fillers do.

Also, small particles of urea-formaldehyde resin have been used as paper fillers. It is reported that these particles are lightweight and, when used as paper fillers, improve opacity, brightness, smoothness and bulk of the paper; however, they have an adverse effect on paper strength, although this effect is reported to be less than that of the mineral fillers.

Disclosed in U.S. Pat. No. 3,824,114 are microcapsules having a solid polymeric shell and a solid, nontacky polymeric core which is grafted to the polymeric shell. The microcapsules may be coated onto cellulosic substrates or incorporated into such substrates and subsequently fused to provide cellulosic substrates having a polymeric film bonded thereto and increased strength, respectively. This patent states at col. 3, lines 29–40 that the polymer containing microcapsules may be formed having an average particle diameter of between about 0.5 and about 1.0 micron. It is stated also that the particles are capable of imparting high opacity to surface coatings of various substrates. It is also stated that the microcapsules may be interspersed with cellulose fibers and formed into a web of such fibers and that the polymeric microcapsules act as non-abrasive, opacifying agents and impart a high opacity to the cllulose substrate ultimately formed.

An object of this invention is to provide organic pigments that can be used as fillers for lightweight paper and that provide opacity, brightness and smoothness without adversely affecting paper strength. A further object of this invention is to provide organic pigments that are self-retaining during the paper making process; that is, the organic pigments are well retained on pulp fibers without the use of conventional retention aids.

In accordance with this invention, there are provided graft copolymer particles, suitable for use as organic pigments and particularly as paper fillers, and consisting essentially of the free radical catalyzed graft copolymerization product of (1) at least one ethylenically unsaturated monomer and (2) a water-soluble cationic prepolymer having an RSV of about 0.1 to about 2.5 (1 M NaCl, 1%, 25° C.) the prepolymer moiety of the graft copolymer particles being present on the surface of the particles, said monomer (1) being selected from the group consisting of methyl alpha-chloroacrylate, ethyl alpha-chloroacrylate, methyl methacrylate, isopropyl methacrylate, phenyl methacrylate, vinyl chloride, acrylonitrile, methacrylonitrile, and monomers having the formula

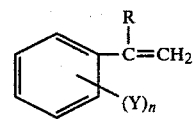

wherein R is hydrogen or methyl, Y is methyl or chlorine, and n is 0, 1, 2, or 3, and said prepolymer (2) being the addition polymerization product of (i) about 5 mole percent to 100 mole percent of at least one cationic monomer selected from the group consisting of

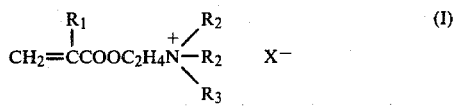

wherein $R_1$ is hydrogen or methyl, $R_2$ is hydrogen or a $C_1$–$C_4$ alkyl, $R_3$ is hydrogen, a $C_1$–$C_4$ alkyl,

where Y is hydroxyl or halogen,

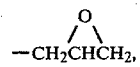

and $-(CH_2CH_2O)_nH$ where n is an integer 1 or mor and $X^-$ is an anion,

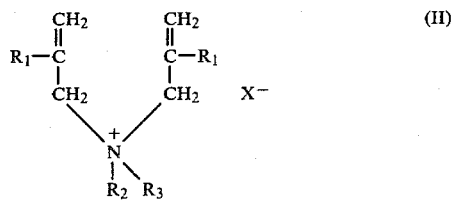

wherein $R_1$ is hydrogen or a $C_1$–$C_4$ alkyl, $R_2$ is hydrogen, alkyl or substituted alkyl, and $R_3$ and $X^-$ are as defined in formula (I),

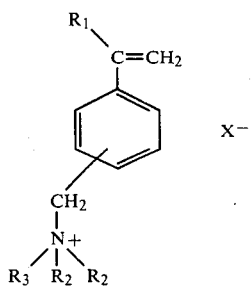

wherein $R_1$, $R_2$, $R_3$ and $X^-$ are as defined in formula (I),

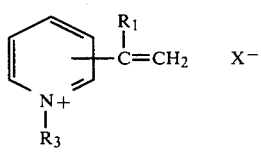

wherein $R_1$, $R_3$ and $X^-$ are as defined in formula (I),

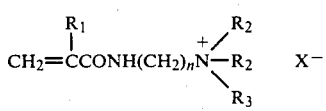

wherein $R_1$, $R_2$, $R_3$ and $X^-$ are as defined in formula (I), and n is an integer 1, 2 or 3 and

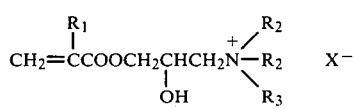

wherein $R_1$, $R_2$, $R_3$ and $X^-$ are as defined in formula (I), and (ii) from about 95 mole percent to 0 mole percent of at least one ethylenically unsaturated nonionic monomer selected from the group consisting of N-vinyl pyrrolidone, ethylenically unsaturated monomers having amide functionality, and ethylenically unsaturated monomers having hydroxyl functionality, the amount of prepolymer (2) employed in preparing the graft copolymer particles being from about 1 part to about 25 parts by weight for each 100 parts by weight of monomer (1) employed. Substantially all the cationic prepolymer moiety of the graft copolymer particles is on the surface of the resulting particles.

When the graft copolymer particles of this invention are suspended in water in the presence of cellulosic pulp fibers, they are attracted to the anionic sites on the surface of the fibers and adhere to the pulp fibers. During the paper making process, which comprises drainage of water from a slurry of pulp fibers, the cationic particles remain with the pulp fibers and are thus well retained in the paper.

Graft copolymer particles perpared using water-soluble prepolymers containing an optimum level of cationic functionality are self-retained during the paper-making process; that is, when these particles are slurried with pulp fibers prior to sheet formation, the particles adhere strongly to the anionic pulp fibers and very little, if any, are lost when the water is filtered off during the paper making process. Thus, no retention aid is required to keep the particles with the pulp fibers. However, known retention aids can be used in the paper making process, if desired. In addition, paper filled with graft copolymer particles prepared according to this invention has strength properties usually equivalent to and sometimes better than unfilled paper of the same weight. Papers filled with mineral pigments, such as clay or titanium dioxide, have substantially lower strength properties than the corresponding unfilled paper.

The monomers used to prepare these particles are such that they will graft polymerize onto the cationic water-soluble prepolymer to form a water-insoluble graft copolymer. It is the insolubility of the graft copolymer that leads to the formation of discrete, essentially spherical particles suspended in water. The initial function of the water-soluble cationic prepolymer is to stabilize the suspension and prevent coagulation of the individual particles. After initial graft copolymerization is effected some homopolymerization of the monomer may occur inside the particles. Essentially stable latexes of the graft copolymer particles are prepared in accordance with this invention without requiring the presence of an additional stabilizer. There are two main requirements for the graft copolymer particles prepared in accordance with this invention. They must (1) be water-insoluble and (2) have a high enough melting or softening point that they will not be deformed to any substantial degree under the conditions of heat or pressure or both to which they will be subjected in use. Use as fillers for paper requires that the particles remain discrete and essentially spherical during web formation, drying and calendering. Preferably, the graft copolymer will have a second order transition temperature (glass transition temperature, $T_g$) of about 75° C. or greater. All the graft copolymers prepared by the working examples that follow have a $T_g$ greater than 75° C.

Any monomer that will graft copolymerize with the water-soluble cationic prepolymers, hereinafter described, to provide graft copolymer particles meeting the above requirements can be employed in this invention. Suitable monomers are monoethylenically unsaturated monomers such, for example, as acrylic esters such as methyl α-chloroacrylate and ethyl α-chloroacrylate; methacrylic esters such as methyl methacrylate, isopropyl methacrylate and phenyl methacrylate; monomers having the formula

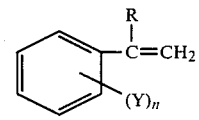

where R is hydrogen or methyl, Y is methyl or chlorine and n is 0, 1, 2 or 3. Examples of such monomers are styrene, α-methyl styrene, monochlorostyrene, dichlorostyrene, trichlorostyrene, monomethylstyrene, dimethylstyrene and trimethylstyrene. Other suitable monomers are vinyl chloride, acrylonitrile and methacrylonitrile.

Mixtures of two or more monoethylenically unsaturated monomers can be used in carrying out this invention provided the resulting graft copolymer particles are water-insoluble and have a $T_g$ of about 75° C. or greater. Also polyethylenically unsaturated monomers, such as divinylbenzene, can be used in admixture with monoethylenically unsaturated monomers to provide crosslinked graft copolymer particles. Of the above listed monoethylenically unsaturated monomers, styrene, vinyl chloride, acrylonitrile and methyl methacrylate are preferred.

The water-soluble cationic prepolymer can be any of a variety of polymers. The main criterion is that it provide the optimum cationic charge for good retention of the resulting graft copolymer particles in paper. For example, in a latex prepared using about 10% prepolymer based on the weight of the monomer used, capacity is highest when the mole percent of the cationic monomer moiety of the water-soluble prepolymer is in the range of about 5 to 50, with the optimum range being from about 10 to about 30 mole percent. These ranges are, of course, dependent on the level of water-soluble cationic prepolymer used to prepare the latex. Thus when about 5% water-soluble prepolymer based on monomer is used, the range would be about 10 to about 100 mole percent cationic monomer moiety with the optimum range being from about 20 to about 60 mole percent. Similar corrections can be made when other levels of water-soluble polymer are used and are within the skill of the art.

The cationic water-soluble prepolymers that are particularly suitable for use in this invention are addition-type polymers prepared from ethylenically unsaturated cationic monomers having the formulas (I), (II), (III), (IV), (V) and (VI) below.

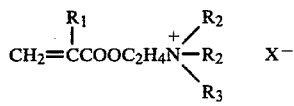

In formula (I), $R_1$ is hydrogen or methyl; $R_2$ is hydrogen or a $C_1-C_4$ alkyl such as methyl, ethyl, propyl, or butyl; $R_3$ is hydrogen, a $C_1-C_4$ alkyl,

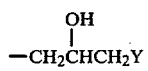

where Y is hydroxyl or halogen such as chlorine and bromine,

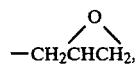

and $(CH_2CH_2O)_nH$ where n is an integer 1 or more, preferably 1 through 20; and $X^-$ is an anion such as $Cl^-$, $Br^-$, $CH_3OSO_3^-$ and $CH_3COO^-$. Monomers of formula (I) are quaternary ammonium salts and acid salts of amino acrylates such as dimethylaminoethylacrylate, diethylaminoethylacrylate, dimethylaminoethylmethacrylate, and diethylaminoethylmethacrylate. Specific quaternary salt monomers having the formula (I) are methacryloyloxyethyltrimethylammonium methyl sulfate and methacryloyloxyethyltrimethylammonium chloride. Specific acid salt monomers having the formula (I) are methacryloyloxyethyldimethylammonium chloride and methacryloyloxyethyldimethylammonium acetate.

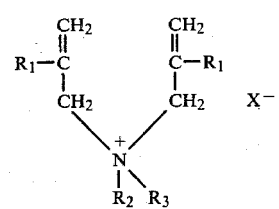

In formula (II), $R_1$ is hydrogen or a $C_1-C_4$ alkyl. $R_2$ is hydrogen, alkyl or substituted alkyl. Typical alkyl groups, which $R_2$ can be, contain from 1 through 18 carbon atoms, preferably from 1 through 6, and include methyl, ethyl, propyl, isopropyl, t-butyl, hexyl, octyl, decyl, dodecyl, tetradecyl, and octadecyl. $R_2$ can also be a substituted alkyl, suitable substituents being any substituent that will not interfere with polymerization through a vinyl double bond. Typically the substituents can be carboxylate, cyano, ether, amino (primary, secondary or tertiary), amide, hydrazide and hydroxyl. $R_3$ and $X^-$ are as defined in formula (I). The formula (II) monomers are quaternary ammonium salts and acid salts of a diallylamine having the formula

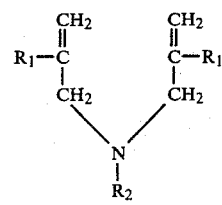

where $R_1$ and $R_2$ are as above defined. Specific examples of quaternary ammonium salt monomers having formula (II) are dimethyldiallylammonium chloride and dimethyldiallylammonium bromide. Specific examples of acid salt monomers having formula (II) are methyldiallylammonium acetate, diallylammonium chloride, N-methyldiallylammonium bromide, 2,2'-dimethyl-N-methyldiallylammonium chloride, N-ethyldiallylammonium bromide, N-isopropyldiallylammonium chloride, N-n-butyldiallylammonium bromide, N-tert-butyldiallylammonium chloride, N-n-hexyldiallylammonium chloride, N-octadecyldiallylammonium chloride, N-acetamidodiallylammonium chloride, N-cyanomethyldiallylammonium chloride, N- -propionamidodiallylammonium bromide, N-acetic ethyl ester substituted diallylammonium chloride, N-ethylmethylether substituted diallylammonium bromide, N- - ethylaminediallylammonium chloride, N-hydroxyethyldiallylammonium bromide and N-aceto-hydrazide substituted diallylammonium chloride.

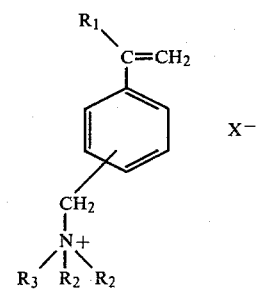

In formula (III), $R_1$, $R_2$, $R_3$ and $X^-$ are as defined in formula (I). Specific examples of monomers of formula (III) are vinylbenzyltrimethylammonium chloride and vinylbenzyltrimethylammonium bromide.

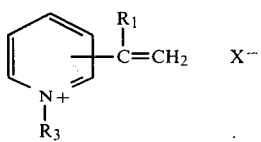

In formula (IV), $R_1$, $R_3$ and $X^-$ are as defined in formula (I). Specific examples of monomers of formula (IV) are 2-vinylpyridinium chloride and 2-vinylpyridinium bromide.

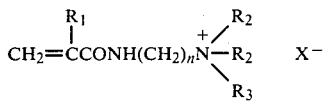

In formula (V), $R_1$, $R_2$, $R_3$ and $X^-$ are as defined in formula (I), and n is an integer 1, 2 or 3. A specific example of a monomer of formula (V) is methacrylamidopropyldimethylammonium chloride.

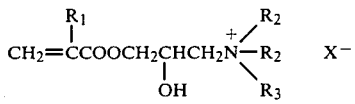

In formula (VI), $R_1$, $R_2$, $R_3$ and $X^-$ are as defined in formula (I). A specific example of a monomer of formula (VI) is 3-methacryloyloxy-2-hydroxypropyldimethylammonium chloride.

The water-soluble cationic prepolymer used in this invention can also be a naturally occurring polymer such as casein or a derivative of a naturally occurring polymer such as chitosan.

As set forth above, there is an optimum level of cationic charge on the polymer particle required for good retention in paper. The optimum charge can be achieved with a cationic homopolymer by varying the amount of homopolymer used to prepare the graft copolymer latex. It is preferred however to adjust the cationic charge by using a copolymer of at least one cationic monomer and at least one nonionic unsaturated monomer capable of addition-type polymerization. Examples of nonionic monomers are monoethylenically unsaturated amide monomers such as acrylamide; methacrylamide; N-acetamidoacrylamide; N-acetamidomethacrylamide; N-methylolacrylamide; diacetoneacrylamide; diacetonemethacrylamide; N,N-dimethylacrlamide; and N-methylacrylamide. Other suitable nonionic monomers are vinyl acetate; 2-hydroxyethylacrylate; 2-hydroxyethylmethacrylate; and N-vinylpyrrolidone. Copolymers of vinyl acetate are subsequently hydrolyzed to replace essentially all the acetate groups with hydroxyl groups.

The water-soluble cationic prepolymers used in this invention can be (A) homopolymers of the cationic monomers shown in formulas (I) through (VI); (B) copolymers of any two or more of the monomers shown in formulas (I) through (VI); and (C) copolymers of at least one of the monomers shown in formulas (I) through (VI) and at least one other ethylenically unsaturated monomer, preferably a nonionic monomer. Thus, the preferred water-soluble cationic prepolymers will consist essentially of from about 5 mole percent to 100 mole percent of at least one monomer shown in formulas (I) through (VI) and from about 95 mole percent to 0 mole percent of at least one other ethylenically unsaturated nonionic monomer.

Highly satisfactory water-soluble cationic prepolymers for use in preparing the graft copolymer particles of this invention are (1) the prepolymers prepared from about 70 mole % to about 98 mole %, preferably from about 82 mole % to about 90 mole %, acrylamide and from about 30 mole % to about 2 mole %, preferably from about 18 mole % to about 10 mole % dimethyldiallylammonium chloride; (2) the prepolymers prepared from about 67 mole % to about 98 mole %, preferably from about 67 mole % to about 89 mole %, acrylamide and from about 33 mole % to about 2 mole %, preferably from about 33 mole % to about 11 mole %, methyldiallylammonium chloride; (3) the prepolymers prepared from about 70 mole % to about 98 mole %, preferably from about 82 mole % to about 91 mole %, acrylamide and from about 30 mole % to about 2 mole %, preferably from about 18 mole % to about 9 mole %, methyldiallylammonium acetate; and (4) the prepolymers prepared from about 70 mole % to about 95 mole %, preferably from about 70 mole % to about 88 mole % acrylamide and from about 30 mole % to about 5 mole %, preferably from about 30 mole % to about 12 mole %, methacryloyloxyethyltrimethylammonium methyl sulfate.

The water-soluble cationic prepolymers are easily and readily prepared by adding, simultaneously, the desired monomers, in the desired amounts, and a water-soluble free-radical polymerization initiator, each in aqueous solution, to a reaction vessel containing water maintained at a temperature of about 80° C. to about 90° C. Suitable free-radical polymerization initiators are those employed in preparing the graft copolymer particles of this invention and which are set forth hereafter. The amount of initiator employed will be that amount sufficient to provide water-soluble cationic prepolymers having an RSV of from about 0.1 to about 2.5, preferably from about 0.1 to about 1.0, measured as a 1% solution in 1 M NaCL at 25° C.

In some cases, it is desirable to have reactive functionality, that is, reactive groups on the surface of the graft copolymer particles. The reactive groups generally increase the bonding properties of the graft copolymer particles. Preferred reactive groups are those that react with cellulose.

Reactive groups can be introduced into the cationic monomer prior to preparation of the prepolymer, or they can be introduced into the prepolymer after preparation thereof, or they can be introduced into the graft copolymer particles after their preparation.

Cellulose reactive groups can be introduced by reacting an epihalohydrin, such as epichlorohydrin, with polymers containing secondary amine functionality, or tertiary amine functionality, or both. Reactive groups provided by epihalohydrin can be an epoxide, the halohydrin form of the epoxide, or an azetdinium group.

Reactive groups can be introduced by means of an aldehyde such as formaldehyde, glyoxal and glutaraldehyde with polymers containing amide functionality, such as those prepolymers prepared by copolymerizing a cationic monomer and acrylamide or those polymers containing secondary amine functionality such as in prepolymers prepared from diallylamine salts. Using dialdehydes, such as glyoxal, the reactive group will be an aldehyde. Using formaldehyde, the reactive group will be the N-methylol group.

The amount of functionalizing agent employed to provide reactive groups on the graft copolymer particles of this invention will be about 0.25 mole to about 3 moles, preferably about 1 mole to about 2 moles, for each mole of amide or amine functionality.

Reaction will be carried out at a temperature of from about 20° C. to about 60° C. at a pH of about 8 to 10 except when formaldehyde is used as the functionalizing agent, reaction is carried out at a pH of from about 2 to 3.

The reactive groups can improve paper strength by providing a means for the graft copolymer particles to react with cellulose fibers. Conventional fillers generally decrease paper strength by interfering with bonding between cellulose fibers. By use of graft copolymer particles having cellulose reactive groups, it is possible to obtain higher paper strength through bonding between fibers through the reactive functional groups on the particles.

The amount of prepolymer used in preparing the graft copolymers of this invention can vary from about 1 part to about 25 parts by weight for each 100 parts by weight of monomer employed. The preferred range is from about 2 to about 10 parts of prepolymer for each 100 parts of monomer.

Graft copolymerization is carried out by adding monomer to an aqueous solution of water-soluble cationic prepolymer in the presence of a free-radical polymerization initiator. The water-soluble prepolymer can all be present in the reaction vessel at the beginning of the run, or all or part of it can be added simultaneously with the monomer. The initiator is usually added continuously along with the monomer. The total reaction time can vary from about one hour to about 24 hours with the preferred time being about 2 to 6 hours. Latexes prepared in accordance with this invention will have a solids content of from about 15% to about 60%. Preferably the amount of water employed in preparing the latexes will be such as to provide latexes having a solids content of from about 25% to about 55%. In some instances, it is possible to dry the latex to a fine powder. In these cases, the powder can be redispersed in water and then added to the pulp slurry prior to formation of the paper. Drying the latex to a fine powder is not usually possible when the graft copolymer particles have reactive funtionality.

The final product is a stable suspension of essentially spherical graft copolymer particles in water. In accordance with this invention graft copolymer particles can be prepared that will have a particle size in the range of about 0.1 micron to about 2 microns.

A wide variety of chemical polymerization initiators can be used to prepare the latexes of this invention, with peroxy compounds being particularly useful. Preferably the initiator will be water soluble.

Suitable water-soluble initiators include those activated by heat, such as sodium persulfate and ammonium persulfate. Polymerizations carried out with these initiators are generally run at temperatures of 70°–95° C. Other water-soluble initiators that are suitable include the so-called redox initiator systems such as ammonium persulfate-sodium bisulfite-ferrous ion and t-butyl hydroperoxide-sodium formaldehyde sulfoxylate. Redox initiators are activated at relatively low temperatures, and polymerizations employing these systems can be carried out at temperatures from about 20° C. to 80° C.

The amount of initiator employed is within the skill of the art. Usually about 0.1 part to about 5 parts by weight of initiator will be employed for each 100 parts by weight of monomer used.

The following examples illustrate the invention.

EXAMPLE 1

A water-jacketed resin kettle equipped with a thermometer, a stirrer, a condenser and three addition funnels was charged with 87.0 g. of distilled water. The funnels were charged with: (1) 71.25 g. acrylamide (1.0 mole) in 166.0 g. distilled water, (2) 3.75 g. dimethyldiallylammonium chloride (DMDAAC, 0.023 mole) in 8.75 g. distilled water, and (3) 1.88 g. ammonium persulfate (0.008 mole) in 35.6 g. distilled water. The kettle contents were heated to 85°–89° C., and the contents of the three funnels were added, dropwise, over a period of three hours. After heating for an additional fifteen minutes, the solution was cooled to room temperature (about 23° C.). The product solution contained 21.9% solids and had an RSV, reduced specific viscosity, of 0.32 (1% solution in 1 M NaCl at 25° C.).

A water-jacketed resin kettle fitted with a thermometer, a stirrer, a condenser and three addition funnels was charged with 493.0 g. of distilled water and 54.4 g. of a 10% solids solution of the above copolymer (5.44 g. dry copolymer). The funnels wee charged with: (1) 164.0 g. of a 10% total solids solution of the above copolymer (16.4 g. dry copolymer), (2) 218.0 g. styrene and (3) 6.0 g. ammonium persulfate in 24.2 g. distilled water. The kettle contents were stirred and heated to 88° C. The contents of the three funnels were added over a period of three hours as the kettle temperature was maintained at 88°–93° C. After heating for an additional fifteen minutes, the product was cooled to room temperature. The product was a white latex containing 25.2% solids. Approximately half of the latex was dialyzed using a 48 angstroms regenerated cellulose membrane to remove unreacted water-soluble prepolymer.

A 240.0 g. sample of the dialyzed latex (50.0 g. dry polymer, 0.056 mole acrylamide) was placed in a reaction kettle, and the pH was adjusted from 4.2 to 9.1 with 0.9 ml. of 1 M sodium hydroxide solution. Glyoxal (16.2 g. of a 40% aqueous solution 0.112 mole) was added, and the pH was adjusted from 6.2 to 9.0 with 0.8 ml. of 1 M sodium hydroxide solution. Water (56 ml.) was added to reduce the reaction solids. The mixture was heated for four hours at 50° C. and the pH was then lowered to 2.0 with 0.5 ml. of concentrated hydrochloric acid. The final product contained 18.2% solids.

EXAMPLES 2–5

Four additional latexes were prepared by the method described in Example 1, except the ratio of acrylamide to DMDAAC was varied as shown in Table 1 below.

| | Prepolymer | | | | | |
|---|---|---|---|---|---|---|
| Ex. | Acrylamide (g) | DMDAAC (g) | $(NH_4)_2S_2O_3$ (g) | Mole Ratio Acrylamide: DMDAAC | % T.S. | RSV |
| 1 | 71.25 | 3.75 | 1.88 | 97.75:2.25 | 21.9 | 0.32 |
| 2 | 67.5 | 7.5 | 1.88 | 95:5 | 21.7 | 0.37 |
| 3 | 60.0 | 15.0 | 1.88 | 90:10 | 21.6 | 0.28 |
| 4 | 56.3 | 18.7 | 1.88 | 87:13 | 21.4 | 0.24 |
| 5 | 37.5 | 37.5 | 1.88 | 70:30 | 21.3 | 0.18 |
| | Initial Latex | | | | | |
| | 10% Prepolymer | Sty- | $(NH_4)_2$— | % Solids | | Particle Size - |

-continued

| Ex. | Solution (g) | rene (g) | S$_2$O$_8$ (g) | Product | Dialyzed | micron (1) |
|---|---|---|---|---|---|---|
| 1 | 218.4 | 218 | 6.0 | 25.2 | 20.8 | 0.4–0.6 |
| 2 | 218.4 | 218 | 6.0 | 25.9 | 21.3 | 0.4–0.6 |
| 3 | 218.4 | 218 | 6.0 | 26.1 | 19.7 | 0.4–1.0 |
| 4 | 218.4 | 218 | 6.0 | 26.0 | 18.3 | 0.5–0.8 |
| 5 | 218.4 | 218 | 6.0 | 25.2 | 17.6 | 0.8–1.26 |

Modified Latex

| Ex. | Dialyzed Latex (g) | 40% Glyoxal (g) | Water (g) | Product % Total Solids |
|---|---|---|---|---|
| 1 | 240.0 | 16.2 | 56.0 | 18.2 |
| 2 | 234.0 | 13.9 | 60.0 | 18.2 |
| 3 | 253.0 | 12.2 | 39.0 | 18.3 |
| 4 | 218.0 | 9.2 | 14.0 | 18.3 |
| 5 | 226.6 | 5.8 | 2.0 | 17.9 |

(g) = grams
(1)Particle size was measured by Transmission Electron Microscopy
T.S. = Total Solids
RSV (reduced specific viscosity) measured as a 1% solution in 1M NaCl at 25° C.

EXAMPLE 6

The compositions of Examples 1–5 were evaluated as fillers for paper. Handsheets were prepared on a Noble & Wood handsheet apparatus. The pulp consisted of a 50:50 blend of bleached hardwood:bleached softwood pulps beaten to a Canadian Standard Freeness of 300 cc. The paper was made at a pH of 4.5 (sulfuric acid, no alum). The latexes were evaluated at addition levels of 4% and 8% (dry basis). The controls were unfilled paper and paper filled with 10% and 20% kaolin clay. The clay was retained through the use of 1% alum and 0.05% of a high molecular weight cationic polyacrylamide retention aid. The results of testing of the paper are summarized in Table 2 below.

EXAMPLES 7–10

Four latexes were prepared by the method described in Example 1 using 10% of various acrylamide-DMDAAC copolymers. The latexes were not reacted with glyoxal. The conditions for the latex syntheses are outlined in Table 3.

EXAMPLE 11

The graft copolymers of Examples 7–10 were evaluated as fillers for paper by the method described in Example 6. Test results are summarized in Table 4.

EXAMPLES 12–16

Several latexes were prepared by the method described in Example 1 with the exception that the water-soluble prepolymers used to prepare the graft copolymers were copolymers of acrylamide and methacryloyloxyethyltrimethylammonium methyl sulfate (MTMMS). The reaction conditions are summarized in Table 5. The latexes were not reacted with glyoxal.

EXAMPLE 17

The graft copolymer particles of Examples 12–16 were evaluated as fillers for paper by the method described in Example 6. A commercial polystyrene latex was used as an additional control in this experiment. The particles in the polystyrene latex bore negative charges and as a result a retention aid was used as shown.

EXAMPLE 18

Clay and a commercial polystyrene latex were evaluated as fillers for paper by the method described in Example 6. The two fillers were evaluated both with and without a cationic polyacrylamide retention aid.

TABLE 2

| Filler (%) | | Retention Aid | Basis Weight (lb./3000 sq. ft.) | Opacity[1] (%) | Dry Tensile Strength (lb./in.) | Mullen Burst (psi) |
|---|---|---|---|---|---|---|
| None | | — | 39.4 | 73.6 | 18.6 | 32.4 |
| Kaolin Clay | (10) | Alum (1%) plus | 41.9 | 80.3 | 15.0 | 25.7 |
| | (20) | Cationic Polyacrylamide (.05%) | 44.6 | 84.5 | 13.5 | 22.4 |
| Example 1 | (4) | — | 39.6 | 74.3 | 19.6 | 36.3 |
| | (8) | — | 40.5 | 75.1 | 19.8 | 34.3 |
| Example 2 | (4) | — | 40.0 | 78.0 | 19.9 | 37.3 |
| | (8) | — | 40.7 | 82.7 | 20.2 | 38.1 |
| Example 3 | (4) | — | 40.1 | 80.0 | 20.4 | 37.3 |
| | (8) | — | 41.4 | 85.1 | 19.8 | 34.5 |
| Example 4 | (4) | — | 40.2 | 81.5 | 19.2 | 34.3 |
| | (8) | — | 41.6 | 86.3 | 19.0 | 33.9 |
| Example 5 | (4) | — | 40.2 | 79.3 | 19.7 | 34.3 |
| | (8) | — | 41.1 | 83.8 | 18.4 | 33.9 |

[1]Opacity measured in accordance with Tappi Standard T-425 (Hunter Opacity Meter)

Test results are summarized in Table 7.

TABLE 3

| | Water-Soluble Prepolymer | | | | | | Latex | | | | |
|---|---|---|---|---|---|---|---|---|---|---|---|
| Ex. | Acrylamide (g.) | DMDAAC (g.) | (NH$_4$)$_2$S$_2$O$_8$ (g.) | Mole Ratio Acrylamide: DMDAAC | % T.S. | RSV | 10% Copolymer Solution (g.) | Styrene (g.) | (NH$_4$)$_2$S$_2$O$_8$ (g.) | % Solids | Particle Size (μ) |
| 7 | 60.0 | 15.0 | 1.88 | 90:10 | 21.6 | 0.28 | 218.4 | 218 | 6.0 | 26.1 | 0.4–1.0[1] |
| 8 | 56.3 | 18.7 | 1.88 | 87:13 | 21.4 | 0.24 | 218.4 | 218 | 6.0 | 26.0 | 0.5–1.0[1] |
| 9 | 46.9 | 28.1 | 1.88 | 79:21 | 21.3 | 0.24 | 218.4 | 218 | 6.0 | 25.7 | ~0.5[2] |

TABLE 3-continued

| | Water-Soluble Prepolymer | | | | | | Latex | | | | |
|---|---|---|---|---|---|---|---|---|---|---|---|
| Ex. | Acrylamide (g.) | DMDAAC (g.) | $(NH_4)_2S_2O_8$ (g.) | Mole Ratio Acrylamide: DMDAAC | % T.S. | RSV | 10% Copolymer Solution (g.) | Styrene (g.) | $(NH_4)_2S_2O_8$ (g.) | % Solids | Particle Size ($\mu$) |
| 10 | 37.5 | 37.5 | 1.88 | 70:30 | 21.3 | 0.18 | 218.4 | 218 | 6.0 | 26.2 | 0.8–1.26[1] |

[1] Particle size was measured by Transmission Electron Microscopy
[2] Particle size estimated by Light Microscopy
(g.) = grams
T.S. = total solids
RSV (reduced specific viscosity) measured as a 1% solution in 1M NaCl at 25° C.

TABLE 4

| Filler (%) | | Retention Aid | Basis Weight (lb/3000 ft.$^2$) | Opacity[1] % | Dry Tensile Strength (lb./in.) | Mullen Burst (psi) |
|---|---|---|---|---|---|---|
| None | | — | 40.7 | 75.2 | 16.3 | 31.4 |
| Kaolin Clay | (10) | Alum (1%) plus | 42.7 | 79.1 | 14.7 | 26.4 |
| | (20) | Cationic Polyacrylamide (0.05%) | 44.3 | 81.0 | 15.3 | 25.0 |
| Example 7 | (4) | — | 41.7 | 80.2 | 16.9 | 30.1 |
| | (8) | — | 42.9 | 84.5 | 15.7 | 28.1 |
| Example 8 | (4) | — | 41.6 | 81.7 | 15.7 | 30.0 |
| | (8) | — | 42.8 | 86.0 | 15.2 | 26.6 |
| Example 9 | (4) | — | 41.8 | 81.6 | 15.3 | 28.8 |
| | (8) | — | 42.9 | 86.3 | 14.1 | 25.9 |
| Example 10 | (4) | — | 41.2 | 79.3 | 15.5 | 28.0 |
| | (8) | — | 41.9 | 82.9 | 15.1 | 27.9 |

[1] Opacity measured in accordance with Tappi Standard T-425 (Hunter Opacity Meter)

TABLE 5

| | Water-Soluble Prepolymer | | | | | | Latex | | | | |
|---|---|---|---|---|---|---|---|---|---|---|---|
| Ex. | Acrylamide (g.) | MTMMS (g.) | $(NH_4)_2S_2O_8$ (g.) | Mole Ratio Acrylamide: MTMMS | % T.S. | RSV | 10% Copolymer Solution (g.) | Styrene (g.) | $(NH_4)_2S_2O_8$ (g.) | % Solids | Average[1] Particle Size ($\mu$) |
| 12 | 120.0 | 180.0 | 22.5 | 70:30 | 21.6 | 0.16 | 2402 | 2398 | 66.0 | 26.0 | 0.8 |
| 13 | 150.0 | 150.0 | 22.5 | 78:22 | 21.6 | 0.154 | 2402 | 2398 | 66.0 | 25.6 | 0.8 |
| 14 | 201.0 | 99.0 | 22.5 | 88:12 | 21.8 | 0.187 | 2402 | 2398 | 66.0 | 25.6 | 0.7 |
| 15 | 225.2 | 74.8 | 22.5 | 91:9 | 21.7 | 0.143 | 2402 | 2398 | 66.0 | 25.6 | 0.8 |
| 16 | 255.0 | 45.0 | 22.5 | 95:5 | 21.7 | 0.168 | 2402 | 2398 | 66.0 | 24.7 | 0.8 | g. = grams
[1] Particle size was estimated from turbidity reading according to the method of A. B. Loebel (Official Digest, 200, February, 1959).
T.S. = total solids
RSV (reduced specific viscosity) measured as a 1% solution in 1M NaCl at 25° C.

TABLE 6

| Filler (%) | | Retention Aid | Basis Weight (lb./3000 sq.ft.) | Opacity[1] % | Dry Tensile Strength (lb./in.) | Mullen Burst (psi) |
|---|---|---|---|---|---|---|
| None | | — | 39.9 | 79.6 | 18.2 | 30.5 |
| Kaolin Clay | (10) | Alum (1%) plus Cationic Polyacrylamide | 44.5 | 86.0 | 13.9 | 21.5 |
| | (20) | (0.05%) | 48.9 | 89.4 | 11.6 | 16.5 |
| Example 12 | (4) | — | 40.6 | 85.0 | 17.5 | 29.1 |
| | (8) | — | 42.1 | 89.4 | 14.8 | 24.4 |
| Example 13 | (4) | — | 40.7 | 85.1 | 17.9 | 30.4 |
| | (8) | — | 41.4 | 89.1 | 16.0 | 33.0 |
| Example 14 | (4) | — | 40.8 | 83.9 | 17.2 | 29.5 |
| | (8) | — | 41.4 | 88.0 | 15.4 | 26.6 |
| Example 15 | (4) | — | 39.6 | 81.0 | 18.4 | 31.1 |
| | (8) | — | 40.6 | 83.9 | 18.3 | 31.9 |
| Example 16 | (4) | — | 39.6 | 78.3 | 17.3 | 32.6 |
| | (8) | — | 39.5 | 78.5 | 17.9 | 30.8 |
| Commercial Polystyrene | (4) | Alum (1%) plus | 40.9 | 86.5 | 15.5 | 24.0 |
| | (8) | Cationic Polyacrylamide (0.05%) | 43.0 | 90.6 | 14.1 | 19.9 |

[1] Opacity measured in accordance with Tappi Standard T-425 (Diano Opacimeter)

TABLE 7

| Filler (%) | Retention Aids | Basis Weight (lb./3000 sq. ft.) | Opacity[1] (%) | Dry Tensile Strength (lb./in.) | Mullen Burst (psi) |
| --- | --- | --- | --- | --- | --- |
| Kaolin Clay (10) | Alum (1%) | 40.3 | 75.9 | 16.2 | 28.9 |
| Kaolin Clay (10) | Alum (1%) plus Cationic Polyacrylamide (.05%) | 42.8 | 80.4 | 16.2 | 26.7 |
| Commercial Polystyrene (4) | Alum (1%) | 39.8 | 76.3 | 18.9 | 30.6 |
| Commercial Polystyrene (4) | Alum (1%) plus Cationic Polyacrylamide (.05%) | 40.8 | 80.5 | 18.3 | 29.4 |

[1]Opacity measured in accordance with Tappi Standard T-425 (Hunter Opacity Meter)

EXAMPLE 19

Dimethylaminoethylmethacrylate (157 g.) was added dropwise to 98 g. of 37% hydrochloric acid. Cooling was necessary to maintain the temperature below 30° C. Water (381 cc.) and isopropanol (12.2 cc.) were added giving a 30% solution. This solution was heated to 50° C. and sparged with nitrogen for 30 minutes followed by heating to 75° C. and adding 3.6 cc of 0.1 M $FeSO_4$ $7H_2O$ followed by 10.9 cc. of t-butylhydroperoxide (90%). When the catalyst addition was completed the solution was stirred for 30 minutes and cooled to room temperature. The viscous solution was diluted to 15.85% solids. RSV=0.53 (1 M NaCl, 1%, 25° C.).

A water-jacketed two liter resin kettle equipped with a thermometer, stirrer, condenser, and three addition funnels was charged with 269 cc. of distilled water. The funnels were charged with: (1) 183 g. of a 12.3% aqueous solution of the poly(methacryloyloxyethyldimethylammonium chloride), prepared as above, (2) 225 g. styrene and (3) 6 g. ammonium persulfate in 25 cc. of distilled water. The contents of the kettle were stirred and heated to 88° C. under nitrogen. The contents of the funnels were added, dropwise, over a period of two hours as the kettle temperature was maintained at 88°–95.5° C. After heating for an additional fifteen minutes, the product was cooled to room temperature. The final product was free of styrene and had a total solids of 36.4%.

EXAMPLE 20

Poly(methacryloyloxyethyldimethylammonium chloride) was prepared as in Example 19 except the solution was diluted to 30% solids instead of 15.85%. 161.5 g. of this 30% solution was placed into a reaction vessel with 359 g. distilled water. The pH of the solution was adjusted from 1.9 to 1.0 with 3.6 cc. of concentrated HCl. Epichlorohydrin (34.7 g.) was added to the reaction vessel giving 15% reaction solids. This mixture was stirred for 6.5 hours after which time the pH rose to 7.6. The pH was then adjusted to 0.5 with 13.7 cc. of concentrated HCl. Total solids=12.3%.

A water-jacketed two liter resin kettle equipped with a thermometer, stirrer, condenser, and three addition funnels was charged with 269 cc. of distilled water. The funnels were charged with (1) 183 g. of a 12.3% aqueous solution of the water-soluble epichlorohydrin modified prepolymer prepared as above, (2) 225 g. styrene and (3) 6 g. ammonium persulfate in 25 cc. of distilled water. The contents of the kettle were stirred and heated to 89° C. under nitrogen. The contents of the funnels were added, dropwise, over a period of two hours as the kettle temperature was maintained at 89°–97° C. After heating for an additional fifteen minutes, the product was cooled to room temperature. The final product was free of styrene and had a total solids of 36.8%.

EXAMPLE 21

A reaction kettle was charged with 4130 g. of distilled water and 145.5 g. of a 51.95% aqueous solution of poly(methyldiallylammonium chloride). The contents of the kettle were heated to 87° C. under nitrogen. 228 g. poly(methyldiallylammonium chloride) in 1597 g. of distilled water, 3040 g. styrene, and 83.7 g. ammonium persulfate in 338 g. of distilled water were added simultaneously, dropwise, over a period of two hours. The temperature was maintained at 87°–100° C. The contents of the kettle were stirred for an additional 15 minutes, cooled to room temperature and filtered through a 100-mesh screen. The resulting latex had a total solids of 37.2% and the particle size was 0.5 micron as measured by the Loebel Method (see Table 5). 806.5 g. of the above latex (300 g. solids) was placed into a reaction flask and the pH adjusted from 1.6 to 1.1 with 8.8 cc. of concentrated hydrochloric acid. Epichlorohydrin (34.2 g.) was added followed by stirring at room temperature. As the reaction progressed the pH rose to 7.3 at which time the pH was adjusted to 1.55 with concentrated hydrochloric acid. The resulting latex had a solids content of 37%.

EXAMPLE 22

A reaction vessel was charged with 200 g. of distilled water, 0.24 g. acetic acid, 3.64 g. sodium acetate and 1 g. isopropanol. This was heated to 60° C. under nitrogen and held for 15 minutes. Methylolacrylamide (40 g. in 160 g. distilled water), methyldiallylammonium chloride (13.3 g. in 53.1 g. distilled water) and ammonium persulfate (0.8 g. in 20 g. distilled water) were added simultaneously, dropwise, over a period of about 1.8 hours, followed by stirring for one hour. The viscous copolymer solution was cooled to room temperature and the pH adjusted from 5.0 to 7.2 with 1.4 cc. of 5 M NaOH. Total solids of the reaction mass was 12.8%. The latex synthesis consisted of charging a reaction kettle with 493 g. of distilled water, 54.4 g. of a 10% aqueous solution of the copolymer above prepared and heating to 89° C. under nitrogen. 164 g. of a 10% aqueous solution of the copolymer above prepared, styrene (218 g.) and ammonium persulfate (6 g. in 24.2 g. of distilled water) were added simultaneously over a period of two hours. The temperature was controlled at between 89°–96° C. After stirring for fifteen minutes the latex was cooled to room temperature and filtered through a 100-mesh screen. The filtered latex had a solids content of 26%.

EXAMPLE 23

A reaction vessel was charged with 200 g. of distilled water, 0.24 g. acetic acid, 3.64 g. sodium acetate and 1.5 g. isopropanol. This was heated to 60°-62° C. under nitrogen and held for 15 minutes. Methylolacrylamide (40 g. in 160 g. distilled water), dimethyldiallylammonium chloride (13.3 g. in 53.1 g. distilled water) and ammonium persulfate (0.8 g. in 20 g. distilled water) were added simultaneously, dropwise, over a period of two hours followed by stirring for one hour. The copolymer solution, which had a solids content of 12.3%, was cooled to room temperature and the pH adjusted to 7.3 and 0.5 cc. 5 M NaOH. A reaction kettle was charged with 439 g. of distilled water, 54.4 g. of a 10% aqueous solution of the above copolymer. The contents of the reaction kettle were heated to 88°-90° C. under nitrogen. 164 g. of a 10% aqueous solution of the above copolymer, 218 g. styrene and 6 g. of ammonium persulfate in 24.2 cc. of distilled water were added simultaneously, dropwise, over a period of about two hours to the reaction kettle. After addition was complete the contents of the kettle were stirred for 15 minutes and cooled to room temperature. The resulting latex had a solids content of 25.4%.

EXAMPLE 24

A reaction vessel was charged with 170 cc. of distilled water and heated to 85° C. under nitrogen sparge. After a 15 minute sparge, acrylamide (110.3 g. in 257.3 cc. distilled water), methyldiallylammonium acetate (133.2 g. of a 29.8% aqueous solution) and ammonium persulfate (7.5 g. in 71.3 cc. distilled water) were added simultaneously, dropwise, over a period of 1.75 hours followed by stirring 15 minutes and cooling. Total Solids=20.4%, RSV=0.35 (1 M NaCl, 1%, 25° C.).

The latex synthesis consisted of charging 798 cc. of distilled water and 1308 g. of a 10% aqueous solution of the copolymer prepared as above to the reaction vessel. This was heated to 93° C. under nitrogen. Styrene (1308 g.), t-butylhydroperoxide (14.6 g. in 127.6 g. of distilled water) and sodium formaldehyde sulfoxylate (14.4 g. in 127.8 cc. distilled water) were added simultaneously, dropwise, over a period of three hours followed by stirring for 15 minutes and cooling to room temperature. The latex was filtered through a 100-mesh screen. Total Solids=39.7%. Particle size=0.65 micron—measured by the Loebel Method—see Table 5.

EXAMPLE 25

Glyoxal modification of the latex of Example 24 was carried out as follows: 214 g. of the above latex was placed into a reaction vessel. The pH was adjusted from 4.9 to 8.5 with 1.4 cc. of 5 M NaOH. Glyoxal (9.3 g. in 13.9 g. distilled water) was added giving a pH of 6. This was readjusted to 8.5 with 1.3 cc. of 5 M NaOH. The latex-glyoxal mixture was allowed to stir while maintaining the pH at 8.5 with periodic addition of a total of 0.2 cc. 5 M NaOH. After about 30 minutes the viscosity increased from 31 to 60 cps. The reaction was terminated by adding 0.4 cc. of concentrated $H_2SO_4$. Total solids=39.2%.

EXAMPLE 26

Latexes of Examples 24 and 25 were evaluated as fillers for paper by the method described in Example 6. Results are set forth in Table 8 below.

TABLE 8

| Filler (%) | Basis Weight (lb./3000 sq.ft.) | Tensile (lb./in.) | Mullen Burst (psi) | Opacity[1] % |
|---|---|---|---|---|
| None | 40.4 | 17.7 | 30.9 | 79.4 |
| Example 24 (4) | 41.2 | 17.4 | 32.5 | 86.2 |
| 24 (8) | 42.3 | 15.0 | 27.4 | 89.2 |
| 25 (4) | 41.5 | 19.5 | 35.9 | 86.3 |
| 25 (8) | 42.3 | 17.6 | 30.9 | 89.3 |
| Kaolin Clay* (10) | 44.2 | 15.2 | 22.0 | 86.2 |
| (20) | 47.6 | 12.6 | 17.9 | 89.4 |

*0.05% of a cationic polyacrylamide, based on the weight of the paper, was employed as a retention aid for the kaolin clay.
[1]Opacity measured in accordance with Tappi Standard T-425 (Diano Opacimeter)

EXAMPLE 27

A water-jacketed resin kettle equipped with a thermometer, a stirrer, a condenser and four addition funnels was charged with 30.0 g. of distilled water, 0.6 g. acetic acid, and 0.85 g. sodium acetate. The funnels were charged with: (1) 60.0 g. styrene, (2) 6.0 g. chitosan, 6.0 g. acetic acid, and 114.0 g. distilled water, (3) 0.65 g. of a 20% aqueous solution of t-butylhydroperoxide, and 25.0 g. distilled water, and (4) 0.65 g. sodium formaldehyde sulfoxylate and 25.0 g. distilled water. The kettle contents were stirred and heated to 88° C. The contents of the four funnels were added, dropwise, over a period of four hours as the kettle temperature was maintained at 60° C. After heating for an additional thirty minutes, the product was cooled to room temperature, not all styrene reacted and the unreacted styrene was removed with a rotary evaporator. The product was a latex having a solids content of 28.8%. The particles of this latex were evaluated as paper fillers by the method of Example 6. Results are set forth in Table 9 below.

TABLE 9

| Filler (%) | Basis Weight (lb./3000 sq.ft.) | Opacity[1] (%) | Tensile (lbs./in.) | Mullen Burst (psi) |
|---|---|---|---|---|
| None | 40.6 | 80.0 | 18.8 | 31.9 |
| Example 27 (4) | 40.8 | 84.1 | 18.5 | 28.8 |
| (8) | 41.9 | 86.6 | 17.7 | 28.5 |
| Kaolin Clay* (10) | 44.6 | 85.7 | 15.2 | 23.0 |
| (20) | 46.3 | 87.5 | 13.3 | 18.6 |
| Commercial Polystyrene* (4) | 41.0 | 83.5 | 17.7 | 28.3 |
| (8) | 41.2 | 86.1 | 16.3 | 26.3 |

*0.05% of cationic polyacrylamide, based on the weight of the paper, was employed as a retention aid for the filler.
[1]Opacity measured in accordance with Tappi Standard T-425 (Hunter Opacity Meter).

The unique advantages of the organic pigments of this invention can best be illustrated by considering the data in Tables 1 and 2. The organic pigments were added in amounts of 4% and 8% and were compared to kaolin clay added in amounts of 10% and 20% (equivalent in volume to 4% and 8% of the organic pigments of this invention). Alum and a high molecular weight cationic polyacrylamide were used as retention aids for the kaolin clay. No retention aid was used with the organic pigments of this invention. The opacity of filled paper is a measure of the retention of the filler in the paper.

The dry tensile and Mullen Burst data in Table 2 illustrate the strength advantages provided by the organic pigments of the present invention. It can be seen that kaolin clay decreases the strength properties relative to unfilled paper by about 20-30%. In contrast, the organic pigments of this invention that give the highest opacity (compositions of Examples 3 and 4) also give strength improvements of about 5-15% relative to unfilled paper. Comparing these organic pigments to clay, the former give opacity equivalent to the latter and in addition, have strength properties 20-50% higher than the latter.

One further advantage of the fillers (organic pigments) of this invention is evident in Table 2. The clay-filled paper is considerably heavier than the control, while the paper containing the filler of this invention is only slightly heavier than the control.

The data in Tables 3 and 4 summarize the evaluation of a similar series of organic pigments stabilized using acrylamidedimethyldiallylammonium chloride copolymers as the water-soluble cationic prepolymer but not reacted with glyoxal. Because there is no reactive functionality on the particles, the strength properties were poorer in this experiment than in the previous one.

The data in Tables 5 and 6 summarize a similar experiment in which the organic pigments were prepared using various copolymers of acrylamide and methacryloyloxyethyltrimethylammonium methyl sulfate as the water-soluble cationic prepolymer. Since there was no reactive functionality on the particles, strength values were slightly poorer than the control in some cases but always significantly better than for the clay-filled paper. For further comparison, a commercially available polystyrene latex was evaluated in this experiment. The particles in this latex have anionic charges, so alum and a polymeric retention aid were used. The data show that the polystyrene particles gave paper having slightly higher opacity than the organic pigments of this invention (but also higher basis weight). The polystyrene particles decreased paper strength, although not quite as much as did the clay.

The data in Table 7 show that conventional fillers like clay and polystyrene require retention aids for optimum performance. Without retention aids opacity is very low in both cases. As shown in Tables 2, 4 and 6, the organic pigments of the present invention provide good opacity without the use of any retention aid.

EXAMPLE 28

A water-jacketed reaction vessel fitted with a thermommometer, a stirrer, a condenser, and an addition funnel was charged with 89 grams distilled water and 436 grams of a 10% aqueous solution of poly(methyldiallylammonium chloride). The resulting solution was heated to 87°-88° C. by circulating hot water through the jacket of the reaction vessel. Styrene (425.2 grams) and divinylbenzene (10.9 grams) were mixed and placed in the addition funnel. 13.3 Grams of a 90% aqueous solution of t-butylhydroperoxide and 108 grams of distilled water were placed in a burette; and 13.6 grams of sodium bisulfite dissolved in 124.5 grams distilled water were placed in another burette. The mixture of styrene and divinylbenzene; the t-butylhydroperoxide solution; and the sodium bisulfite solution were added dropwise, simultaneously, over a period of 2 hours to the contents of the reaction vessel. After stirring for 20 minutes, a slight odor of styrene was evident. Additional t-butyl-hydroperoxide solution (3.4 grams of t-butylhydroperoxide dissolved in 27 grams distilled water) and additional sodium bisulfite solution (3.4 grams sodium bisulfite dissolved in 31 grams of distilled water) were added to the reaction mass and the reaction mass was stirred for an additional 20 minutes. The resulting latex was cooled to room temperature and filtered through a 100 mesh screen. Total solids=27.7%. Particle size=0.8 micron—measured by Coulter Counter.

As previously set forth, polyethylenically unsaturated monomers, such as divinylbenzene, can be used in admixture with monoethylenically unsaturated monomers to provide crosslinked graft copolymer particles. Examples of other suitable polyethylenically unsaturated monomers that can be used for this purpose are diallyl phthalate, ethylene glycol dimethacrylate, 1,3-hexanediol dimethacrylate, polyethylene glycol dimethacrylate, polypropylene glycol dimethacrylate, trivinylbenzene, divinylnaphthalene, diallyl maleate, diallyl fumarate, trimethylol propane trimethacrylate, and pentaerythritol tetraacrylate. The preferred polyethylenically unsaturated monomers, also referred to as crosslinking monomers, are divinylbenzene, diallyl phthalate, ethylene glycol dimethacrylate, and 1,3-butylene glycol dimethacrylate.

While the organic pigments of this invention have particular utility as paper fillers, they can also be used in paper coatings together with a suitable binder therefor. Furthermore, they can be used in paints, inks, and the like. They can also be applied as coatings, together with a suitable binder, to glass surfaces, metal surfaces, wood surfaces, plaster surfaces and the like.

EXAMPLE 29

A water-jacketed resin kettle equipped with a thermometer, a stirrer, a condenser and three addition funnels was charged with 75.0 g. of distilled water. The funnels were charged as follows: funnel (1) with 35.0 g. acrylamide (0.49 mole) in 70.0 g. distilled water, funnel (2) with 15.0 g. vinylbenzyltrimethylammonium chloride (0.07 mole) in 60.0 g. distilled water, and funnel (3) with 1.25 g. ammonium persulfate in 50.0 g. distilled water. The kettle contents were heated to 80° C., and the contents of the funnels were added, dropwise, over a period of 2½ hours as the temperature was maintained at 80°-85° C. After heating for an additional 30 minutes, the solution was cooled to room temperature (about 23° C.). The product solution contained 22.0% solids and had an RSV, reduced specific viscosity, of 0.27 (1% solution in 1 M NaCl, 25° C.).

A water-jacketed resin kettle fitted with a thermometer, a stirrer, a condenser and three addition funnels was charged with 503.8 g. of distilled water and 26.2 g. of the above copolymer solution (5.8 g. dry copolymer). The funnels were charged as follows: funnel (1) with 78.6 g. of the above copolymer solution (17.3 g. dry copolymer) plus 120.0 g. distilled water, funnel (2) with 230.0 g. styrene, and funnel (3) with 5.1 g. ammonium persulfate in 120.0 g. distilled water. The kettle contents were stirred and heated to 79° C. The contents of the three funnels were added, dropwise, over a period of four hours as the kettle temperature was maintained at 79°-88° C. After heating for an additional 15 minutes, the product was cooled to room temperature, and the pH was adjusted from 1.9 to 7.5 with 25% sodium hydroxide solution. The product was filtered through a 100 mesh sieve. The product was a white latex containing 25.1% total solids and having an average particle size of 0.62 micron (method of A. B. Loebel, Official Digest, 200, February, 1959).

EXAMPLE 30

A water-jacketed resin kettle equipped with a thermometer, a stirrer, a condenser and two addition funnels was charged with 200 g. of distilled water. The funnels were charged as follows: funnel (1) with 77.0 g. acrylamide (1.08 mole), 17.1 g. 4-vinylpyridine (0.16 mole), and 16.0 g. concentrated hydrochloric acid solution (0.19 mole) in 200 g. distilled water, and funnel (2) with 2.5 g. ammonium persulfate in 100 g. distilled water. The kettle contents were heated to 80° C., and the contents of the funnels were added, dropwise, over a period of 2 hours, 25 minutes as the temperature was maintained at 80°–85° C. After heating for an additional 30 minutes, the solution was cooled to room temperature (about 23° C.). The product solution contained 21.6% solids and had an RSV, reduced specific viscosity, of 0.34 (1% solution in 1 M NaCl, 25° C.).

A water-jacketed resin kettle fitted with a thermometer, a stirrer, a condenser and three addition funnels was charged with 503.4 g. of distilled water and 26.6 g. of the above copolymer solution (5.7 g. dry copolymer). The funnels were charged as follows: funnel (1) with 79.8 g. of the above copolymer solution (17.2 g. dry copolymer) plus 120 g. distilled water, funnel (2) with 230 g. styrene, and funnel (3) with 5.1 g. ammonium persulfate in 120.0 g. distilled water. The kettle contents were stirred and heated to 78° C. The contents of the funnels were added, dropwise, at the same time. The contents of funnels (1) and (2) were added over a period of 4 hours. The contents of funnel (3) were added over a period of 4 hours, 15 minutes. The kettle temperature was maintained at 78°–84° C. throughout the additions. The product was cooled to room temperature, and the pH was adjusted from 2.0 to 4.6 with 10% sodium hydroxide solution. The product was filtered through a 100 mesh sieve. The product was a white latex containing 25.8% total solids and having an average particle size of 0.45 micron (method of Loebel, Official Digest, 200, February, 1959).

EXAMPLE 31

A water-jacketed resin kettle equipped with a thermometer, a stirrer, a condenser and two addition funnels was charged with 200 g. of distilled water. The funnels were charged as follows: funnel (1) with 69.0 g. acrylamide (0.97 mole) and 31.0 g. methacrylamidopropyltrimethylammonium chloride (0.14 mole) in 200 g. distilled water, and funnel (2) with 2.5 g. ammonium persulfate in 100 g. distilled water. The kettle contents were heated to 77° C., and the contents of the funnels were added, dropwise, over a period of 2½ hours as the temperature was maintained at 77°–85° C. After heating for an additional 15 minutes, the solution was cooled to room temperature (about 23° C.). The product solution contained 22.7% solids and had an RSV, reduced specific viscosity, of 0.52 (1% solution in 1 M NaCl, 25° C.).

A water-jacketed resin kettle fitted with a thermometer, a stirrer, a condenser and three addition funnels was charged with 504.7 g. of distilled water and 25.3 g. of the above copolymer solution (5.7 g. dry copolymer). The funnels were charged as follows: funnel (1) with 76.1 g. of the above copolymer solution (17.3 g. dry copolymer) and 120.0 g. distilled water, funnel (2) with 230.0 g. styrene, and funnel (3) with 5.1 g. ammonium persulfate in 120 g. distilled water. The kettle contents were stirred and heated to 79° C. The contents of the funnels were added, dropwise, at the same time. The contents of funnels (1) and (2) were added over a period of 4 hours. The contents of funnel (3) were added over a period of 4 hours, 15 minutes. The kettle temperature was maintained at 79°–87° C. throughout the additions. The product was cooled to room temperature, and the pH was adjusted from 2.1 to 8.0 with 25% sodium hydroxide solution. The product was filtered through a 100 mesh sieve. The product was a white latex containing 25.5% total solids and having an average particle size of 0.47 micron (method of Loebel, Official Digest, 200, February, 1959).

EXAMPLE 32

A water-jacketed resin kettle equipped with a thermometer, a stirrer, a condenser and two addition funnels was charged with 200 g. of distilled water. The funnels were charged as follows: funnel (1) with 67 g. acrylamide (0.94 mole) and 33 g. 3-methacryloyloxy-2-hydroxypropyltrimethylammonium chloride (0.14 mole) in 200 g. distilled water, and funnel (2) with 2.5 g. ammonium persulfate in 100 g. distilled water. The kettle contents were heated to 80° C., and the contents of the funnels were added, dropwise, over a period of 2 hours, 25 minutes as the temperature was maintained at 80°–84° C. After heating for an additional 15 minutes, the solution was cooled to room temperature (about 23° C.). The product solution contained 21.3% solids and had an RSV, reduced specific viscosity, of 0.46 (1% solution in 1 M NaCl, 25° C.).

A water-jacketed resin kettle fitted with a thermometer, a stirrer, a condenser and three addition funnels was charged with 503 g. of distilled water and 27 g. of the above copolymer solution (5.8 g. dry copolymer). The funnels were charged as follows: funnel (1) with 81 g. of the above copolymer solution (17.3 g. dry copolymer) and 120 g. distilled water, funnel (2) with 230 g. styrene, and funnel (3) with 5.1 g. ammonium persulfate in 120 g. distilled water. The kettle contents were stirred and heated to 77° C. The contents of the funnels were added, dropwise, at the same time. The contents of funnels (1) and (2) were added over a period of 4 hours. The contents of funnel (3) were added over a period of 4 hours, 15 minutes. The kettle temperature was maintained at 77°–88° C. throughout the additions. The product was cooled to room temperature, and the pH was adjusted from 1.9 to 6.5 with 25% sodium hydroxide solution. The product was filtered through a 100 mesh sieve. The product was a white latex containing 25.5% total solids and having an average particle size of 0.8 micron (method of Loebel, Official Digest, 200, February, 1959).

EXAMPLE 33

The compositions of Examples 29–32 were evaluated as fillers for paper. Handsheets were prepared on a Noble & Wood handsheet apparatus. The pulp consisted of a 50:50 blend of bleached hardwood:bleached softwood pulps beaten to a Canadian Standard Freeness of 500. The paper was made at a pH of 4.5 (sulfuric acid, no alum). The latexes were evaluated at addition levels of 4% and 8% (dry basis). The control was unfilled paper. The results of testing of the paper are summarized in Table 10 below.

TABLE 10

| Filler (%) | | Basic Weight (lb./3000 sq. ft.) | Opacity[1] (%) | Brightness[2] (%) | Dry Tensile[3] Strength (lb./in.) | Mullen[3] Burst (psi) |
|---|---|---|---|---|---|---|
| None | | 39.6 | 73.4 | 80.2 | 19.2 | 31.0 |
| Example 29 | (4) | 40.4 | 78.4 | 81.6 | 19.4 | 32.5 |
| | (8) | 41.0 | 83.0 | 82.6 | 18.1 | 30.6 |
| Example 30 | (4) | 42.1 | 79.2 | 83.6 | 21.9 | 33.5 |
| | (8) | 40.9 | 83.0 | 85.5 | 21.5 | 32.9 |
| Example 31 | (4) | 41.6 | 78.3 | 82.8 | 19.6 | 30.7 |
| | (8) | 41.5 | 81.4 | 83.1 | 21.0 | 33.3 |
| Example 32 | (4) | 39.3 | 75.3 | 79.8 | 20.6 | 31.0 |
| | (8) | 41.6 | 80.8 | 83.6 | 21.5 | 31.4 |

[1]Opacity measured in accordance with Tappi Standard T-425 (Diano Opacity Meter) average of 4 tests
[2]Brightness measured in accordance with Tappi Standard T-452 (Diano Brightness Meter) average of 4 tests
[3]Average of 8 tests The novel organic pigments of this invention can be used alone or in combination with other organic pigments, or inorganic pigments or both as fillers and coatings for paper.

The above description and examples are illustrative of this invention and not in limitation thereof.

What we claim and desire to protect by Letters Patent is:

1. Water-insoluble graft copolymer particles consisting essentially of the free radical catalyzed graft copolymerization product of (1) at least one ethylenically unsaturated monomer (a) and at least one polyethylenically unsaturated monomer (b) in an amount at least sufficient to provide cross linked graft copolymer particles, and (2) a water-soluble cationic prepolymer having an RSV of about 0.1 to about 2.5 (1 M NaCl, 1%, 25° C.), the prepolymer moiety of the graft copolymer particles being present on the surface of the particles, said monomer (a) being selected from the group consisting of methyl alpha-chloroacrylate, ethyl alpha-chloroacrylate, methyl methacrylate, isopropyl methacrylate, phenyl methacrylate, vinyl chloride, acrylonitrile, methacrylonitrile, and monomers having the formula

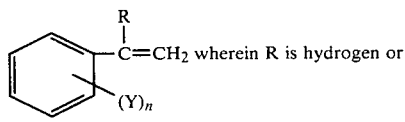

wherein R is hydrogen or methyl, Y is methyl or chlorine, and n is 0, 1, 2, or 3, said monomer (b) being selected from the group consisting of divinylbenzene; diallyl phthalate; ethylene glycol dimethacrylate; 1,3-butylene glycol dimethacrylate; 1,6-hexanediol dimethacrylate; polyethylene glycol dimethacrylate; polypropylene glycol dimethacrylate; trivinylbenzene; divinylnaphthalene; diallyl maleate; diallyl fumarate; trimethylol propane trimethacrylate; and pentaerythritol tetraacrylate, and said prepolymer (2) being the addition polymerization product of (i) about 5 mole percent to 100 mole percent of a cationic monomer having the formula

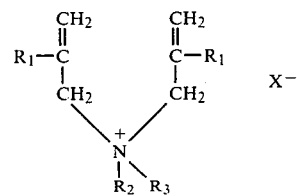

wherein
$R_1$ is hydrogen or a $C_1$-$C_4$ alkyl,
$R_2$ is hydrogen, alkyl or substituted alkyl,
$R_3$ is hydrogen, a $C_1$-$C_4$ alkyl,

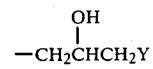

where Y is hydroxyl or halogen,

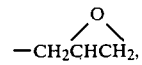

or $-(CH_2CH_2O)_nH$ where n is an integer 1 or more and $X^-$ is an anion, and (ii) from about 95 mole percent to 0 mole percent of at least one monoethylenically unsaturated amide monomer, the amount of prepolymer (2) employed in preparing the graft copolymer particles being from about 1 part to about 25 parts by weight for each 100 parts by weight of monomers (1) employed.

2. Water-insoluble graft copolymer particles consisting essentially of the free radical catalyzed graft copolymerization product of (1) at least one ethylenically unsaturated monomer (a) and at least one polyethylenically unsaturated monomer (b) in an amount at least sufficient to provide cross linked graft copolymer particles, and (2) a water-soluble cationic prepolymer having an RSV of about 0.1 to about 1.0 (1 M NaCl, 1%, 25° C.), the prepolymer moiety of the graft copolymer particles being present on the surface of the particles, said monomer (a) being a monomer having the formula

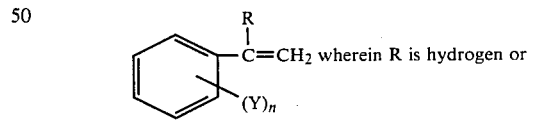

methyl, Y is methyl or chlorine, and n is 0, 1, 2, or 3, said monomer (b) being selected from the group consisting of divinylbenzene; diallyl phthalate; ethylene glycol dimethacrylate; 1,3-butylene glycol dimethacrylate; 1,6-hexanediol dimethacrylate; polyethylene glycol dimethacrylate; polypropylene glycol dimethacrylate; trivinylbenzene; divinylnaphthalene; diallyl maleate; diallyl fumarate; trimethylol propane trimethacrylate; and pentaerythritol tetraacrylate, and said prepolymer (2) being the addition polymerization product of (i) about 5 mole percent to 100 mole percent of a cationic monomer having the formula

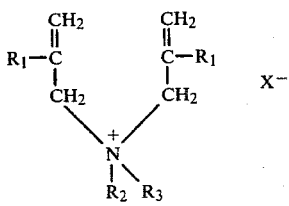

wherein
$R_1$ is hydrogen or a $C_1$–$C_4$ alkyl,
$R_2$ is hydrogen, alkyl or substituted alkyl,
$R_3$ is hydrogen, a $C_1$–$C_4$ alkyl,

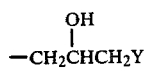

where Y is hydroxyl or halogen,

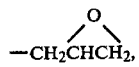

or $\text{\textendash}(CH_2CH_2O)_nH$ where n is an integer 1 or more and $X^-$ is an anion, and (ii) from about 95 mole percent to 0 mole percent of at least one monoethylenically unsaturated amide monomer, the amount of prepolymer (2) employed in preparing the graft copolymer particles being from about 2 parts to about 10 parts by weight for each 100 parts by weight of monomer (1) employed.

3. The water-insoluble graft copolymer particles of claim 2 wherein monomer (a) is styrene and the monoethylenically unsaturated amide monomer is acrylamide.

4. The water-insoluble graft copolymer particles of claim 2 wherein monomer (a) is styrene and the prepolymer (2) is prepared from about 70 mole % to about 98 mole % acrylamide and from about 30 mole % to about 2 mole % dimethyldiallylammonium chloride.

5. The water-insoluble graft copolymer particles of claim 2 wherein monomer (a) is styrene and the prepolymer (2) is prepared from about 67 mole % to about 98 mole % acrylamide and from about 33 mole % to about 2 mole % methyldiallylammonium chloride.

6. The water-insoluble graft copolymer particles of claim 2 wherein monomer (a) is styrene and the prepolymer (2) is prepared from about 70 mole % to about 98 mole % acrylamide and from about 30 mole % to about 2 mole % methyldiallylammonium acetate.

7. The water-insoluble graft copolymer particles of claim 2 wherein monomer (a) is styrene and the prepolymer (2) is prepared from about 82 mole % to about 90 mole % acrylamide and from about 18 mole % to about 10 mole % dimethyldiallylammonium chloride.

8. The water-insoluble graft copolymer particles of claim 2 wherein monomer (a) is styrene and the prepolymer (2) is prepared from about 67 mole % to about 89 mole % acrylamide and from about 33 mole % to about 11 mole % methyldiallylammonium chloride.

9. The water-insoluble graft copolymer particles of claim 2 wherein monomer (a) is styrene and the prepolymer (2) is prepared from about 82 mole % to about 91 mole % acrylamide and from about 18 mole % to about 9 mole % methyldiallylammonium acetate.

10. A process for preparing a latex of graft copolymer particles which comprises graft copolymerizing in aqueous media and in the presence of a free-radical initiator (1) at least one ethylenically unsaturated monomr (a) and at least one polyethylenically unsaturated monomer (b) in an amount at least sufficient to provide cross linked graft copolymer particles, and (2) a water-soluble cationic prepolymer having an RSV of about 0.1 to about 2.5 (1 M NaCl, 1%, 25° C.), said monomer (a) being selected from the group consisting of methyl alpha-chloroacrylate, ethyl alpha-chloroacrylate, methyl methacrylate, isopropyl methacrylate, phenyl methacrylate, vinyl chloride, acrylo nitrile, methacrylonitrile, and monomers having the formula

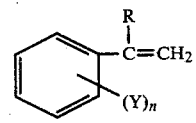

wherein R is hydrogen or methyl, Y is methyl or chlorine, and n is 0, 1, 2, or 3, said monomer (b) being selected from the group consisting of divinylbenzene; diallyl phthalate; ethylene glycol dimethacrylate; 1,3-butylene glycol dimethacrylate; 1,6-hexanediol dimethacrylate; polyethylene glycol dimethacrylate; polypropylene glycol dimethacrylate; trivinylbenzene; divinylnaphthalene; diallyl maleate; diallyl fumarate; trimethylol propane trimethacrylate; and pentaerythritol tetraacrylate, and said prepolymer (2) being the addition polymerization product of (i) about 5 mole percent to 100 mole percent of a cationic monomer having the formula

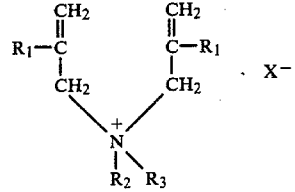

wherein
$R_1$ is hydrogen or a $C_1$–$C_4$ alkyl,
$R_2$ is hydrogen, alkyl or substituted alkyl,
$R_3$ is hydrogen, a $C_1$–$C_4$ alkyl,

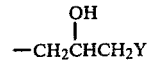

where Y is hydroxyl or halogen,

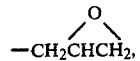

or $\text{\textendash}(CH_2CH_2O)_nH$ where n is an integer 1 or more and $X^-$ is an anion, and (ii) from about 95 mole percent to 0 mole percent of at least one monoethylenically unsaturated amide monomer, the amount of prepolymer (2) employed in preparing the graft copolymer particles being from about 1 part to about 25 parts by weight for each 100 parts by weight of monomers (1) employed.

11. A process for preparing a latex of graft copolymer particles which comprises graft copolymerizing in aqueous media and in the presence of a free-radical initiator (1) at least one ethylenically unsaturated monomr (a) and at least one polyethylenically unsaturated monomer (b) in an amount at least sufficient to provide cross linked graft copolymer particles, and (2) a water-soluble cationic prepolymer having an RSV of about 0.1 to about 1.0 (1 M NaCl, 1%, 25° C.), said monomer (a) being a monomer having the formula

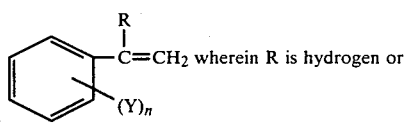 wherein R is hydrogen or wherein R is hydrogen or methyl, Y is methyl or chlorine, and n is 0, 1, 2, or 3, said monomer (b) being selected from the group consisting of divinylbenzene; diallyl phthalate; ethylene glycol dimethacrylate; 1,3-butylene glycol dimethacrylate; 1,6-hexanediol dimethacrylate; polyethylene glycol dimethacrylate; polypropylene glycol dimethacrylate; trivinylbenzene; divinylnaphthalene; diallyl maleate; diallyl fumarate; trimethylol propane trimethacrylate; and pentaerythritol tetraacrylate, and said prepolymer (2) being the addition polymerization product of (i) about 5 mole percent to 100 mole percent of a cationic monomer having the formula

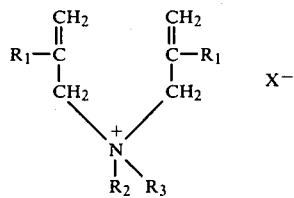

wherein
$R_1$ is hydrogen or a $C_1$-$C_4$ alkyl,
$R_2$ is hydrogen, alkyl or substituted alkyl,
$R_3$ is hydrogen, a $C_1$-$C_4$ alkyl,

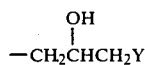

where Y is hydroxyl or halogen,

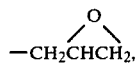

or $-(CH_2CH_2O)_nH$ where n is an integer 1 or more and $X^-$ is an anion, and (ii) from about 95 mole percent to 0 mole percent of at least one monoethylenically unsaturated amide monomer, the amount of prepolymer (2) employed in preparing the graft copolymer particles being from about 1 part to about 25 parts by weight for each 100 parts by weight of monomers (1) employed.

12. The method of claim 11 wherein monomer (a) is styrene and the monoethylenically unsaturated amide monomer is acrylamide.

13. The method of claim 11 wherein monomer (a) is styrene and prepolymer (2) is prepared from about 70 mole % to about 98 mole % acrylamide and from about 30 mole % to about 2 mole % dimethyldiallylammonium chloride.

14. The method of claim 11 wherein monomer (a) is styrene and prepolymer (2) is prepared from about 67 mole % to about 98 mole % acrylamide and from about 33 mole % to about 2 mole % methyldiallylammonium chloride.

15. The method of claim 11 wherein monomer (a) is styrene and prepolymer (2) is prepared from about 70 mole % to about 98 mole % acrylamide and from about 30 mole % to about 2 mole % methyldiallylammonium acetate.

16. The method of claim 11 wherein monomer (a) is styrene and prepolymer (2) is prepared from about 82 mole % to about 90 mole % acrylamide and from about 18 mole % to about 10 mole % dimethyldiallylammonium chloride.

17. The method of claim 11 wherein monomer (a) is styrene and prepolymer (2) is prepared from about 67 mole % to about 89 mole % acrylamide and from about 33 mole % to about 11 mole % methyldiallylammonium chloride.

18. The method of claim 11 wherein monomer (a) is styrene and prepolymer (2) is prepared from about 82 mole % to about 91 mole % acrylamide and from about 18 mole % to about 9 mole % methyldiallylammonium acetate.

19. The water-insoluble graft copolymer particles of claims 1, 2, 3, 4, 5, 6, 7, 8, and 9 wherein the prepolymer moiety of the particles has chemically bonded thereto a cellulose reactive group.

20. Water-insoluble graft copolymer particles consisting essentially of the free radical catalyzed graft copolymerization product of (1) at least one ethylenically unsaturated monomer and (2) a water-soluble cationic prepolymer having an RSV of about 0.1 to about 2.5 (1 M NaCl, 1%, 25° C.), the prepolymer moiety of the graft copolymer particles being present on the surface of the particles, said monomer (1) being selected from the group consisting of methyl alpha-chloroacrylate, ethyl alpha-chloro acrylate, methyl methacrylate, isopropyl methacrylate, phenyl methacrylate, vinyl chloride, acrylonitrile, methacrylonitrile, and monomers having the formula

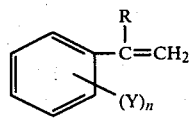

wherein R is hydrogen or methyl, Y is methyl or chlorine, and n is 0, 1, 2, or 3, and said prepolymer (2) being the addition polymerization product of
(i) about 5 mole percent to 100 mole percent of a cationic monomer having the formula

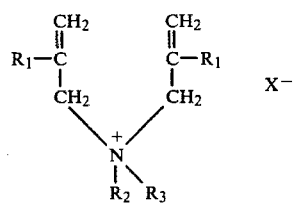

wherein
R₁ is hydrogen or a $C_1$-$C_4$ alkyl,
R₂ is hydrogen, alkyl or substituted alkyl,
R₃ is hydrogen, a $C_1$-$C_4$ alkyl,

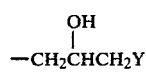

where Y is hydroxyl or halogen,

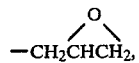

or $-(CH_2CH_2O)_nH$ where n is an integer 1 or more and $X^-$ is an anion, and (ii) from about 95 mole percent to 0 mole percent of at least one monoethylenically unsaturated amide monomer, the amount of prepolymer (2) employed in preparing the graft copolymer particles being from about 1 part to about 25 parts by weight for each 100 parts by weight of monomers (1) employed, said prepolymer moiety of the particles having chemically bonded thereto a cellulose reactive group.

21. Water-insoluble graft copolymer particles consisting essentially of the free radical catalyzed graft copolymerization product of (1) at least one ethylenically unsaturated monomer and (2) a water-soluble cationic prepolymer having an RSV of about 0.1 to about 1.0 (1 M NaCl, 1%, 25° C.), the prepolymer moiety of the graft copolymer particles being present on the surface of the particles, said monomer (1) being a monomer having the formula

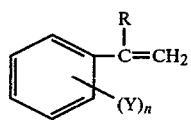

wherein R is hydrogen or methyl, Y is methyl or chlorine, and n is 0, 1, 2, or 3, and said prepolymer (2) being the addition polymerization product of (i) about 5 mole percent to 100 mole percent of a cationic monomer having the formula

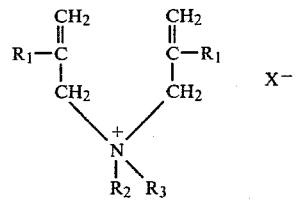

wherein
R₁ is hydrogen or a $C_1$-$C_4$ alkyl,
R₂ is hydrogen, alkyl or substituted alkyl,
R₃ is hydrogen, a $C_1$-$C_4$ alkyl,

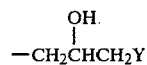

where Y is hydroxyl or halogen,

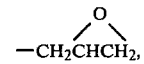

or $-(CH_2CH_2O)_nH$ where n is an integer 1 or more and $X^-$ is an anion, and (ii) from about 95 mole percent to 0 mole percent of at least one monoethylenically unsaturated amide monomer, the amount of prepolymer (2) employed in preparing the graft copolymer particles being from about 2 parts to about 10 parts by weight for each 100 parts by weight of monomers (1) employed, said prepolymer moiety of the particles having chemically bonded thereto a cellulose reactive group.

22. The water-insoluble graft copolymer particles of claim 21 wherein monomer (1) is styrene and the monoethylenically unsaturated amide monomer is acrylamide.

23. The water-insoluble graft copolymer particles of claim 21 wherein monomer (1) is styrene, the prepolymer (2) is prepared from about 70 mole % to about 98 mole % acrylamide and from about 30 mole % to about 2 mole % dimethyldiallylammonium chloride, and the cellulose reactive group is an aldehyde.

24. The water-insoluble graft copolymer particles of claim 21 wherein monomer (1) is styrene, the prepolymer (2) is prepared from about 67 mole % to about 98 mole % acrylamide and from about 33 mole % to about 2 mole % methyldiallylammonium chloride, and the cellulose reactive group is an aldehyde.

25. The water-insoluble graft copolymer particles of claim 21 wherein monomer (1) is styrene, the prepolymer (2) is prepared from about 70 mole % to about 98 mole % acrylamide and from about 30 mole % to about 2 mole % methyldiallylammonium acetate, and the cellulose reactive group is an aldehyde.

26. The water-insoluble graft copolymer particles of claim 21 wherein monomer (1) is styrene and the prepolymer (2) is prepared from about 82 mole % to about 90 mole % acrylamide and from about 18 mole % to about 10 mole % dimethyldiallylammonium chloride, and the cellulose reactive group is an aldehyde.

27. The water-insoluble graft copolymer particles of claim 21 wherein monomer (1) is styrene, the prepolymer (2) is prepared from about 67 mole % to about 89 mole % acrylamide and from about 33 mole % to about 11 mole % methyldiallylammonium chloride, and the cellulose reactive group is an aldehyde.

28. The water-insoluble graft copolymer particles of claim 21 wherein monomer (1) is styrene, the prepolymer (2) is prepared from about 82 mole % to about 91 mole % acrylamide and from about 18 mole % to about 9 mole % methyldiallylammonium acetate, and the cellulose reactive group is an aldehyde.

* * * * *